Aug. 22, 1961     A. M. HARJA     2,996,922
GYROSCOPIC DEVICE

Filed March 23, 1959     2 Sheets-Sheet 1

Aug. 22, 1961  A. M. HARJA  2,996,922
GYROSCOPIC DEVICE

Filed March 23, 1959  2 Sheets-Sheet 2

United States Patent Office 2,996,922
Patented Aug. 22, 1961

2,996,922
GYROSCOPIC DEVICE
Arne M. Harja, San Gabriel, Calif., assignor to Clary Corporation, San Gabriel, Calif., a corporation of California
Filed Mar. 23, 1959, Ser. No. 801,124
1 Claim. (Cl. 74—5.1)

This invention relates to gyroscopic devices and has particular reference to means for controlling caging of the gimbal or gimbals of a gyroscope. The invention is particularly intended for use in guided missiles or the like which utilize one or more gyroscopes for controlling the flight thereof or for telemetering information concerning the flight path of the missile.

A principal object of the present invention is to provide an automatic control for the caging mechanism of the gimbal or gimbals of a gyroscope.

Another object is to provide an uncaging device for a gyroscope which is responsive to acceleration forces.

Another object is to provide an uncaging device for a gyroscope which is actuated by acceleration forces to uncage the gyroscope and to thereafter maintain the same in such condition.

Another object is to provide an uncaging device for a gyroscope embodied in a missile or the like which uncaging device is responsive to acceleration forces developed during launching of such missile.

The manner in which the above and other objects of the invention are accomplished will be readily understood on reference to the following specification when read in conjunction with the accompanying drawings, wherein.

Figure 1:
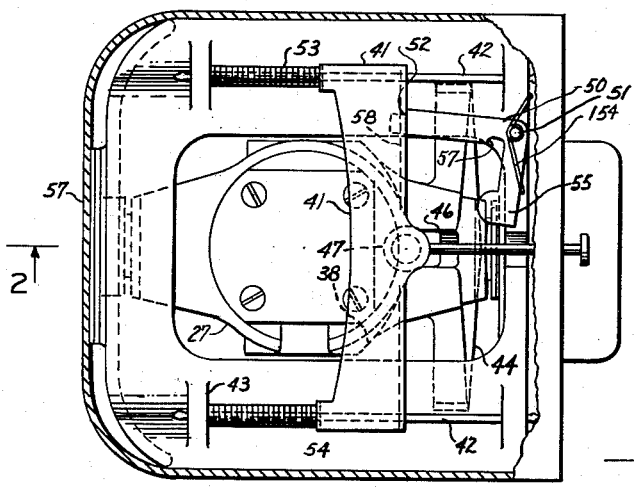
FIG. 1 is a plan view, partly in section, of a gyroscope embodying a preferred form of the present invention and illustrating the gyroscope in a caged position.

Referring to the drawings, the gyroscope comprises a fly-wheel or rotor 11 which is rotatably mounted, through ball bearings 12 and 13, on a shaft 14. The bearings are held in spaced relation by sleeves 15 and this assembly is retained in place by a flange 16 which is attached to the fly-wheel 11 by bolts, one of which is shown at 17.

The shaft 14 is attached to opposite legs of an inner gimbal 18.

An electric motor, generally indicated at 20, is provided for rotating the fly-wheel 11 and comprises a rotor unit 21 integrally attached to the fly-wheel and a stator unit 22, including a motor coil 23, integrally attached to a hub 24 suitably attached to the gimbal 18.

The inner gimbal 18 is provided with trunnion journals 25 rotatably mounted in ball bearings 26 carried by an outer gimbal 27, the pivotal axis of the journals 25 being perpendicular to and intersecting the axis of rotation of the fly-wheel 11.

The outer gimbal 27 is provided with trunnion journals 28 (FIG. 2) rotatably mounted in ball bearings 29 supported by an outer spider frame 30.

A shell 31 is fitted over the frame 30 and a rear protective cap 32 is attached to the frame by bolts, one of which is shown at 33. The latter have studs 34 extending therefrom for attachment by nuts 39 to a gyroscope supporting framework, partially shown at 35.

A suitable synchro or control transformer, generally indicated at 36, is attached to the gyroscope frame 30 and cooperates with one of the journals 28 of the outer gimbal to transfer electrical information relative to the attitude of a missile or other vehicle in which the gyroscope is embodied.

Means are provided for caging and uncaging the gyroscope. For this purpose, a caging cam 38 (FIGS. 1 and 2) is formed on the inner gimbal and cooperates with a roller 40 rotatably supported by a carrier slide 41. The latter is slideably mounted on rods 42 supported from the frame 30 by bosses 43.

The roller 40 also cooperates with an end cam 44 formed on the outer gimbal 27.

Figure 2:
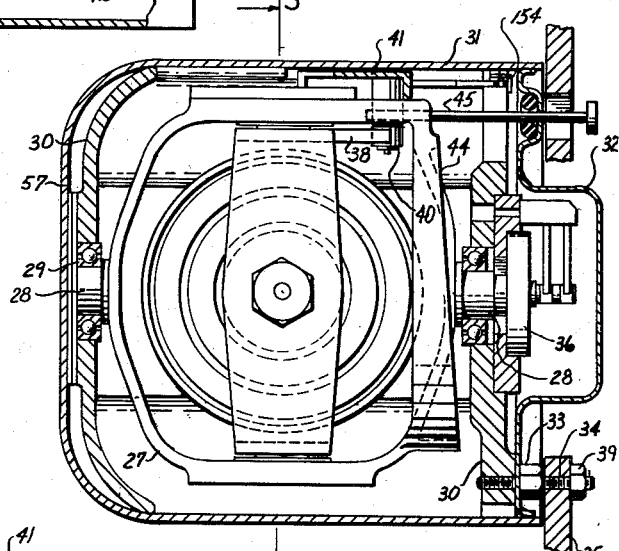
FIG. 2 is a sectional elevation view of the gyroscope and is taken substantially along the line 2—2 of FIG. 1.
Figure 3:
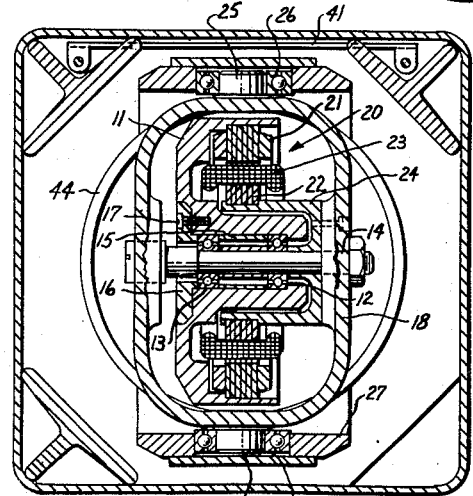
FIG. 3 is a transverse sectional view through the gyroscope and is taken along the line 3—3 of FIG. 2.

In caging the gyroscope, pressure is applied either manually or by a suitable actuator (not shown) against the outer end of a plunger 45 attached to the carrier 41, thereby urging the roller 40 first against the surface of the cam 44 whereby to cam the outer gimbal into its caged position shown in FIGS. 1 and 2. In such position of the gimbal, the roller passes through a slot 46 in cam 44 and thence engages the surface of the inner gimbal cam 38 to cage the inner gimbal. The roller 40 finally comes to rest in a centering notch 47 in the cam 38 thereby holding both gimbals in their central caged position.

Figure 4:
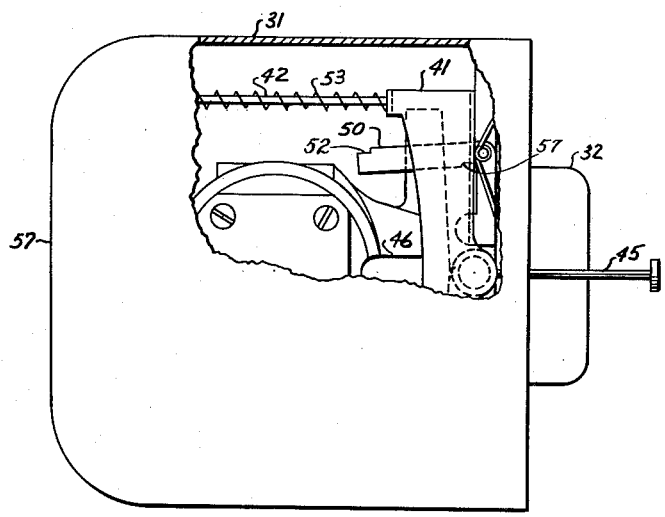
FIG. 4 is a view similar to that of FIG. 1, but illustrating the gyroscope in an uncaged position.

In accordance with the present invention, latching means are provided to latch the gyroscope in its caged position and to uncage the same upon acceleration of the gyroscope in a forward direction, i.e. to the left in FIGS. 1, 2 and 4. For this purpose, a latch 50 in the form of a bell crank is pivoted at 51 to the frame 30. The latch is provided with a latching shoulder 52 adapted to engage a coacting shoulder on the carrier 41 whereby to latch the same in its caged position against the action of two compression springs 53 and 54 interposed between two of the bosses 43 and the carrier 41. The latch is urged clockwise by a light torsion spring 154 extending between the same and the frame 30 and is provided with a weighted arm 55 extending substantially perpendicular to the axes of the outer gimbal bearings 29.

Figure 5:
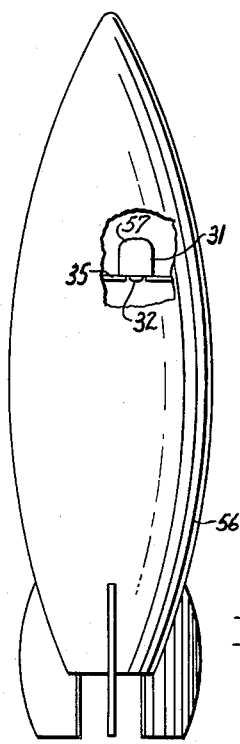
FIG. 5 is a plan view of a missile illustrating the gyroscope of the present invention embodied therein.

Preferably, the gyroscope is mounted in a missile 56 (FIG. 5) or the like with the forward end 57 thereof facing the forward end of the missile. In such position the weighted arm of the caging latch extends substantially perpendicular to the axis of the missile. During positioning of the missile into its proper attitude for launching, the gyroscope is located in its caged position shown in FIG. 1. Then, when the missile is launched, the inertia forces acting on the weighted arm 55 will cause the latch to rock counterclockwise, permitting springs 53 and 54 to move the carrier and roller 40 to uncaged positions.

In order to prevent rebound of the carrier and roller 40 back toward caging position due to violent right-hand movement of the carrier or to vibration of the mechanism missile, a second latching shoulder 57 is formed on the latch 50. When the slide reaches its right-hand position, the shoulder 57 drops over a shoulder 58 on the carrier thereby latching the same in uncaged position at least until the acceleration of the missile has diminished.

Although I have described my invention in detail and have therefore used certain terms and language herein, it is to be understood that the present disclosure is illustrative rather than restrictive and that changes and modifications may be made without departing from the spirit or scope of the invention as set forth in the claims appended hereto. For example, the torsion spring 154 may be omitted, permitting the latch 50 to latch the carrier 41 and roller 40 in their uncaged positions throughout the flight of the missile. In such case it may be desirable to so form the pivotal connection 51 that a sufficient amount of friction exists between the latch 50 and the frame 30 whereby the latch will remain in place,

Having thus described the invention, what I desire to secure by United States Letters Patent is:

A gyroscopic device comprising a rotor, a gimbal supporting said rotor for movement about its spin axis, means supporting said gimbal for movement about a second axis perpendicular to said spin axis, a caging device for said gimbal, a latch, means on said latch for latching said caging device in caging condition, spring means for moving said caging device to uncaging condition, said latch being responsive to acceleration forces applied to said gyroscopic device to release said caging device to said spring means, and a second means on said latch effective upon movement of said caging device to said uncaging condition to latch said caging device in said uncaging condition.

References Cited in the file of this patent

UNITED STATES PATENTS

| | | |
|---|---|---|
| 2,842,967 | Borden et al. | July 15, 1958 |
| 2,846,889 | M. Ten Bosch et al. | Aug. 12, 1958 |
| 2,868,611 | Carleton | Jan. 13, 1959 |
| 2,874,576 | Barnes et al. | Feb. 24, 1959 |